(12) United States Patent
Kunjappan et al.

(10) Patent No.: US 8,816,679 B2
(45) Date of Patent: Aug. 26, 2014

(54) 180-DEGREE ARC POSITION ENCODER WITH AN EXTENDED ANGULAR POSITION SENSING RANGE

(75) Inventors: ShanoPrasad Kunjappan, Bangalore (IN); Perry A. Holman, Jr., Garland, TX (US); Madhan Raj Bagianathan, Hosur (IN); Dinesh Naik, Bangalore (IN); Christopher Kenney, Davis, IL (US); Ravi Kasturi Raj, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 121 days.

(21) Appl. No.: 13/550,285

(22) Filed: Jul. 16, 2012

(65) Prior Publication Data

US 2014/0015520 A1   Jan. 16, 2014

(51) Int. Cl.
 *G01B 7/30* (2006.01)
(52) U.S. Cl.
 USPC ............ 324/207.25; 324/207.2; 324/207.21
(58) Field of Classification Search
 CPC .......... G01D 5/00; G01R 33/06; G01R 33/07; G01R 33/09; G01B 7/30
 USPC ............. 324/173, 174, 207.14, 207.2–207.26
 See application file for complete search history.

(56) References Cited

U.S. PATENT DOCUMENTS

| | | | | |
|---|---|---|---|---|
| 5,528,139 A * | 6/1996 | Oudet et al. | | 324/207.2 |
| 5,889,400 A * | 3/1999 | Nakazawa | | 324/207.2 |
| 6,191,579 B1 | 2/2001 | Striker | | |
| 6,326,780 B1 * | 12/2001 | Striker | | 324/207.21 |
| 6,593,734 B1 * | 7/2003 | Gandel et al. | | 324/207.25 |
| 6,940,276 B2 * | 9/2005 | Shafiyan-Rad et al. | | 324/207.22 |
| 7,112,962 B2 | 9/2006 | Ricks et al. | | |
| 8,018,223 B2 | 9/2011 | Latoria et al. | | |
| 2003/0090265 A1 * | 5/2003 | Wan et al. | | 324/207.25 |
| 2007/0279049 A1 * | 12/2007 | Johnson | | 324/207.25 |
| 2011/0043197 A1 | 2/2011 | Trontelj | | |
| 2011/0140690 A1 * | 6/2011 | Antraygue | | 324/207.25 |

OTHER PUBLICATIONS

Honeywell International Inc., "SMART Position Sensor, 100° and 180° Arc Configurations Superior Measurement. Accurate. Reliable. Thinking." downloadable from http://sensing.honeywell.com/smart%20sps%20series%20arc%20ps_000732-1-en_final_10mar11, 4 pages, downloaded on Mar. 2011.

* cited by examiner

*Primary Examiner* — Arleen M Vazquez
*Assistant Examiner* — Raul Rios Russo
(74) *Attorney, Agent, or Firm* — Craige Thompson; Thompson Patent Law Offices (57) ABSTRACT

This disclosure describes techniques for sensing an angular position of a rotating object over an angular position range that includes up to 360 degrees using an arc position encoder comprising a substantially 180-degree angular position sensing range. The encoder may include a base comprising an arc length defined by a first and a second end, one or more magnetic field sensors disposed within the base between the first and second ends, and one or more polarity transition sensors also disposed within the base between the first and second ends. The encoder may further include a magnetic target that includes first and second magnetic poles disposed on opposite ends so as to generate a uniform magnetic field, wherein the magnetic target is coupled to the rotating object so as to rotate about an axis of rotation located substantially in a center of a circle defined by the base.

20 Claims, 5 Drawing Sheets

180-DEGREE ARC POSITION ENCODER WITH AN EXTENDED ANGULAR POSITION SENSING RANGE

TECHNICAL FIELD

This disclosure relates to position encoders, and more particularly, to techniques for using a position encoder to sense an angular position of a rotating object.

BACKGROUND

Position encoders are among a number of electro-mechanical transducers that may be used to sense a position of an object. Position encoders may be configured to sense an actual, or "absolute," position of an object, as well as a "relative" position, or a displacement, of the object. Furthermore, a position encoder may comprise any of a wide variety of linear and angular, or "rotary," position encoders. In some examples, position encoders may use contact-based sensing means to sense a position of an object by mechanically coupling the object to the position encoder, e.g., to a movable member or a rotating shaft of the position encoder, which may be mechanically coupled to a sensing element of the position encoder. In other examples, position encoders may employ a wide variety of contactless sensing means, such as optical, magnetic, capacitive, and inductive means, as some examples. Position encoders employing such contactless sensing means may be less susceptible to wear and may provide greater durability compared to contact-based position encoders.

As one example, a linear position encoder may sense a position of an object moving along a linear trajectory relative to the linear position encoder. For example, the linear position encoder may sense a position of an encoder "read-head" that is coupled to the object relative to an encoder track as the encoder read-head and the object move together along the encoder track. The position of the read-head relative to the encoder track may be sensed using mechanical, optical, magnetic, capacitive, or inductive means, as well as using other sensing means.

As another example, an angular, or rotary, position encoder may sense an angular position of an object that is rotating about an axis of rotation relative to the angular position encoder. For example, in the case of the angular position encoder employing magnetic sensing means, as described above, the angular position encoder may sense an angular position of a magnetic target that is coupled to the rotating object relative to one or more magnetic field sensors disposed within a base of the angular position encoder. The magnetic target may be disposed substantially at a center of the base so as to generate a uniform magnetic field which varies from the perspective of the one or more magnetic field sensors based on the angular position of the magnetic target relative to the sensors. In this example, the one or more magnetic field sensors may include magnetoresistive (MR) sensors, Hall-Effect sensors, or other magnetic sensors.

SUMMARY

In general, this disclosure describes techniques for using an arc position encoder to sense an angular position of a rotating object over an extended angular position range. For example, the arc position encoder may comprise a substantially 180-degree angular position sensing range, e.g., an angular position sensing range that is within +/−1%, 5%, or 10% of 180 degrees, as some examples. The techniques of this disclosure may, in some cases, enable extending the 180-degree sensing range of the arc position encoder, for example, by incorporating additional functional elements into the arc position encoder, and without adding any structural elements that may substantially increase the outer dimensions of the arc position encoder, such that the arc position encoder may be used to sense an angular position of a rotating object over an angular position range that includes up to 360 degrees.

In particular, the techniques described herein may enable extending the 180-degree sensing range of the arc position encoder such that the arc position encoder may be used to sense the angular position of the rotating object anywhere within a 360-degree angular position range, i.e., anywhere within an angular position range that includes up to 360 degrees. More specifically, the techniques may enable the arc position encoder to sense the angular position of the rotating object within the 180-degree sensing range of the arc position encoder, as well as outside of the 180-degree sensing range and anywhere within the remaining 180-degree angular position range, wherein the 180-degree sensing range and the remaining 180-degree angular position range collectively define the 360-degree angular position range. For example, using the techniques of this disclosure, the arc position encoder may be configured to sense the angular position of the rotating object within the 360-degree angular position range, or within a subset of the 360-degree angular position range, e.g., a 270-degree angular position range.

In one example, an angular position sensing system for sensing an angular position of a rotating object over an angular position range that includes up to 360 degrees includes an arc position encoder comprising a substantially 180-degree angular position sensing range, wherein the arc position encoder includes a base comprising an arc length defined by a first end and a second end of the base, one or more magnetic field sensors disposed within the base between the first and second ends, one or more polarity transition sensors disposed within the base between the first and second ends, and a magnetic target comprising a first magnetic pole and a second magnetic pole disposed on opposite ends of the magnetic target so as to generate a uniform magnetic field, wherein the magnetic target is coupled to the rotating object so as to rotate about an axis of rotation located substantially in a center of a circle defined by the base, and wherein, at any given time, one of the first and second magnetic poles is located within the 180-degree angular position sensing range of the arc position encoder, and another one of the first and second magnetic poles is located outside of the 180-degree angular position sensing range.

In another example, a method of sensing an angular position of a rotating object over an angular position range that includes up to 360 degrees using an arc position encoder comprising a substantially 180-degree angular position sensing range includes receiving one or more polarity transition signals from one or more polarity transition sensors disposed within a base of the arc position encoder between a first end and a second end of the base, the one or more polarity transition signals indicating a transition of one of a first magnetic pole and a second magnetic pole of a magnetic target coupled to the rotating object so as to rotate about an axis of rotation located substantially in a center of a circle defined by the base, wherein the first and second magnetic poles are disposed on opposite ends of the magnetic target so as to generate a uniform magnetic field, into the 180-degree angular position sensing range of the arc position encoder, and another one of the first and second magnetic poles out of the 180-degree angular position sensing range, receiving one or more proximity signals from one or more magnetic field sensors disposed within the base between the first and second ends, the one or more proximity signals indicating relative proximity of the one of the first and second magnetic poles within the 180-degree angular position sensing range of the arc position encoder to each of the one or more magnetic field sensors, and determining the angular position of the rotating object within the angular position range that includes up to 360 degrees based at least in part on the one or more polarity transition signals and the one or more proximity signals.

The details of one or more examples are set forth in the accompanying drawings and the description below. Other features, objects, and advantages in addition to those described below will be apparent from the description and drawings, and from the claims.

DETAILED DESCRIPTION

In general, this disclosure describes techniques for using an arc position encoder to sense an angular position of a rotating object over an extended angular position range. For example, the arc position encoder may comprise a substantially 180-degree angular position sensing range, e.g., an angular position sensing range that is within +/−1%, 5%, or 10% of 180 degrees, as some examples. As described in greater detail below, the techniques of this disclosure may, in some cases, enable extending the 180-degree sensing range of the arc position encoder, for example, by incorporating additional functional elements into the arc position encoder, and without adding any structural elements that may substantially increase the outer dimensions of the arc position encoder, such that the arc position encoder may be used to sense an angular position of a rotating object over an angular position range that includes up to 360 degrees.

In particular, the techniques described herein may enable extending the 180-degree sensing range of the arc position encoder such that the arc position encoder may be used to sense the angular position of the rotating object anywhere within a 360-degree angular position range, i.e., anywhere within an angular position range that includes up to 360 degrees. More specifically, the techniques may enable the arc position encoder to sense the angular position of the rotating object within the 180-degree sensing range of the arc position encoder, as well as outside of the 180-degree sensing range and anywhere within the remaining 180-degree angular position range, wherein the 180-degree sensing range and the remaining 180-degree angular position range collectively define the 360-degree angular position range. For example, using the techniques of this disclosure, the arc position encoder may be configured to sense the angular position of the rotating object within the 360-degree angular position range, or within a subset of the 360-degree angular position range, e.g., a 270-degree angular position range.

An angular, or "rotary," position encoder may sense an angular position of an object that is rotating about an axis of rotation relative to the angular position encoder. For example, in the case of the angular position encoder employing magnetic sensing techniques, the angular position encoder may sense an angular position of a magnetic target that is coupled to the rotating object relative to one or more magnetic field sensors disposed within a base of the angular position encoder. The magnetic target may be disposed substantially at a center of the base so as to generate a uniform magnetic field which varies from the perspective of the one or more magnetic field sensors based on the angular position of the magnetic target relative to the sensors. For example, the one or more magnetic field sensors may include magnetoresistive (MR) sensors, Hall-Effect sensors, or other magnetic sensors. In some examples, in instances where MR sensors are used, each MR sensor may be configured in a Wheatstone-Bridge configuration, or another configuration.

Existing angular position encoders, and, in particular, those employing magnetic sensing techniques, are generally configured to sense an angular position of a rotating object in one of a 180-degree and a 360-degree angular position range. For example, an angular position encoder configured to sense an angular position of a rotating object over a 180-degree angular position range may comprise a 180-degree, or "arc" position encoder, which may include an arc base and one or more magnetic field sensors, e.g., MR sensors, or other sensors, disposed within the arc base. Alternatively, an angular position encoder configured to sense an angular position of a rotating object over a full 360-degree angular position range may comprise a relatively more complex 360-degree, or "full-range," position encoder, which may include a circular base and one or more magnetic field sensors disposed within the circular base. In some examples, the circular base may require relatively more magnetic field sensors than the arc base of the arc position encoder in order to enable sensing the angular position of the rotating object over the 360-degree angular position range.

Accordingly, existing techniques for using angular position encoders to sense angular position of rotating objects include using full-range position encoders to sense angular position of rotating objects over a 360-degree range, as well as arc position encoders to sense angular position of rotating objects over a 180-degree range. Additionally, existing techniques may include combining multiple, e.g., two, arc position encoders to sense angular position of rotating objects over a 360-degree range. Furthermore, as previously described, full-range angular position encoders may require relatively more complex hardware, e.g., a circular base and a greater number of magnetic field sensors disposed within the circular base, as well as more complex processing of output signals of the magnetic field sensors, compared to arc position encoders. In contrast, arc position encoders may require relatively less complex hardware, e.g., an arc base and fewer magnetic field sensors disposed within the arc base, as well as less complex signal processing, compared to full-range angular position encoders. However, arc position encoders may have a limited angular position sensing range, i.e., a 180-degree angular position sensing range, as explained above.

As previously described, the techniques of this disclosure may, in some cases, enable extending a substantially 180-degree sensing range of an arc position encoder. As one example consistent with the techniques described herein, the arc position encoder may include, in addition to one or more magnetic field sensors disposed within a base of the arc position encoder, one or more polarity transition sensors also disposed within the base. For example, the one or more polarity transition sensors may be disposed substantially at one or more ends of the base. In some examples, additional polarity transition sensors may be disposed substantially away from the ends along an arc length of the base (e.g., at a middle point along the arc length of the base). According to the techniques, the one or more polarity transition sensors may be configured to sense transitions of opposing magnetic poles of a rotating magnetic target (e.g., North and South magnetic poles disposed on opposite ends of the magnetic target) of the arc position encoder, which may be coupled to the rotating object, into and out of the 180-degree sensing range. For example, at any given time, one of two such opposing magnetic poles may be located within the 180-degree sensing range, while the other of the two opposing magnetic poles may be located outside of the 180-degree sensing range. As such, the one or more polarity transition sensors may be configured to sense transitions of each of the two opposing magnetic poles into and out of the 180-degree sensing range. In some examples, the one or more polarity transition sensors disposed substantially at the one or more ends of the base and the additional polarity transition sensors disposed substantially away from the ends along the arc length of the base may be used to sense the transitions, wherein the additional polarity transition sensors may be used to verify the transitions sensed by the one or more polarity transition sensors disposed substantially at the one or more ends of the base.

Development of the techniques described herein has demonstrated that, in general, opposing magnetic poles of a rotating magnetic target of an arc position encoder produce substantially similar (e.g., symmetrical) responses with respect to one or more magnetic sensing elements disposed within a base of the arc position encoder. This is the case in particular with respect to MR sensors, which may generate substantially similar outputs in response to magnetic fields having a same field angle relative to each of the MR sensors, but opposite field polarities. The techniques of this disclosure may, in some cases, take advantage of the above-described phenomenon in order to extend the substantially 180-degree sensing range of the arc position encoder, as described above.

For example, by sensing the transitions of the two opposing magnetic poles using the one or more polarity transition sensors in the manner described above, the arc position encoder may be configured to determine which of the two opposing magnetic poles is present within the 180-degree sensing range at any given time. The arc position encoder may be further configured to sense the position of the respective magnetic pole within the 180-degree sensing range (e.g., as the magnetic pole travels through the 180-degree sensing range) using the one or more magnetic field sensors. For example, the one or more magnetic field sensors may sense relative proximity of the respective magnetic pole to each of the one or more magnetic field sensors.

In some examples, the angular position of the respective magnetic pole within the 180-degree sensing range may correspond to an angular position of the rotating object coupled to the magnetic target within a corresponding 180-degree sub-range of the 360-degree angular position range. In this manner, for the two opposing magnetic poles described above, two such 180-degree sub-ranges may be defined within the 360-degree angular position range. Furthermore, because the two opposing magnetic poles are conventionally disposed on opposite ends of the magnetic target, as also described above, the two 180-degree sub-ranges may be 180-degrees out of phase with respect to one another. In other words, the two 180-degree sub-ranges may be consecutive and non-overlapping within the 360-degree angular position range, i.e., each 180-degree sub-range may comprise one half of the full 360-degree angular position range. As such, the arc position encoder may be configured to sense the angular position of each of the two opposing magnetic poles within the 180-degree sensing range when the respective magnetic pole is present within the sensing range, which may correspond to the angular position of the rotating object within each of the two 180-degree sub-ranges, or, collectively, within the full 360-degree angular position range.

As explained above, the techniques of this disclosure may, in some cases, effectively extend the substantially 180-degree sensing range of the arc position encoder to encompass the 360-degree angular position range. As a result, the arc position encoder may be configured to sense the angular position of the magnetic target, and thereby the rotating object, over the extended 360-degree angular position range, i.e., anywhere within an angular position range that includes up to 360 degrees. In this manner, the techniques of this disclosure may reduce the complexity of angular position encoders used to sense angular position of rotating objects over a 360-degree angular position range, while requiring minimal additional functional components and signal processing resources, and without requiring any additional structural elements that may substantially increase the outer dimensions of the arc position encoder.

Figure 1:
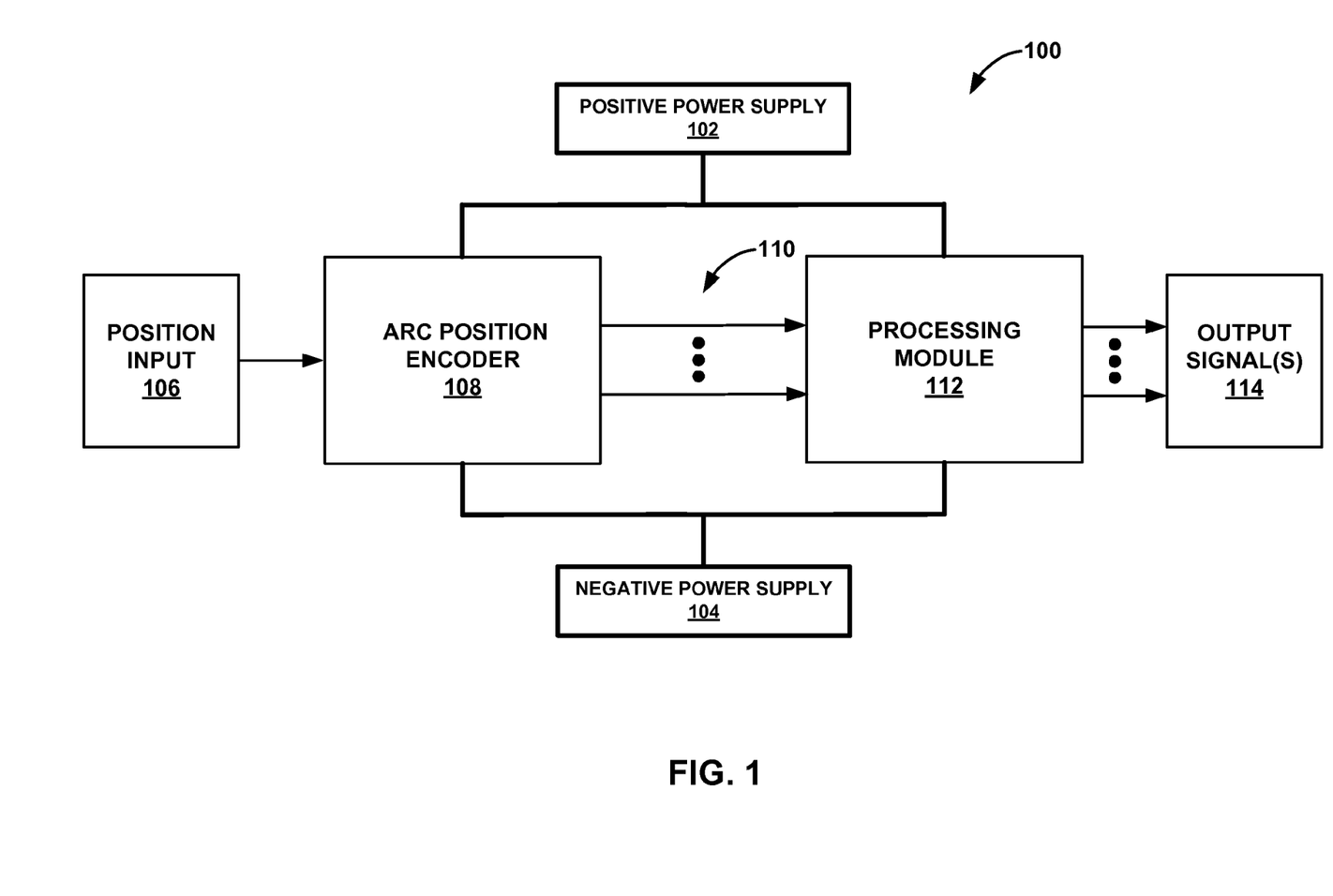
FIG. 1 is a block diagram that illustrates one example of an angular position sensing system, consistent with the techniques of this disclosure.

FIG. 1 is a block diagram that illustrates one example of an angular position sensing system 100, consistent with the techniques of this disclosure. As shown in FIG. 1, system 100 includes a positive power supply 102, a negative power supply 104, a position input 106, an arc position encoder 108, one or more arc position encoder output signal(s) 110, a processing module 112, and one or more processing module output signal(s) 114. System 100 may comprise an electro-mechanical system or device of any kind, including any combination of mechanical structural components and hardware, electro-mechanical transducers, discrete electronic components, digital and/or analog circuitry, and mechanical and electronic sub-systems or sub-devices of any kind. Examples of processing module 112 are described in greater detail below. Examples of arc position encoder 108 are also described in greater detail below, as well as with reference to arc position encoders 200 and 300 of FIGS. 2 and 3, respectively.

In the example of FIG. 1, position input 106 may comprise an angular position of a rotating object (not shown) within a 360-degree angular position range relative to arc position encoder 108. In other words, position input 106 may represent a physical angular position of the rotating object within the 360-degree angular position range (i.e., anywhere within an angular position range that includes up to 360 degrees), relative to arc position encoder 108. For example, the rotating object may be configured to rotate about an axis of rotation located substantially in a center of a circle defined by a base or arc position encoder 108, as will be described in greater detail below with reference to FIGS. 2 and 3. In some examples, the rotating object may comprise any of a variety of rotating shafts, gears, or wheels. In other examples, the rotating object may comprise another object that rotates about the axis or rotation.

System 100, and in particular, arc position encoder 108, may be configured to convert position input 106 from an angular position of the rotating object to one or more electrical signals in order to generate arc position encoder output signal(s) 110. For example, arc position encoder output signal(s) 110 may comprise one or more voltage and/or current signals indicative of position input 106, i.e., of the angular position of the rotating object within the 360-degree angular position range relative to arc position encoder 108. Furthermore, processing module 112 may be configured to process arc position encoder output signal(s) 110 to generate processing module output signal(s) 114. Processing module output signal(s) 114 may comprise any combination of analog and/or digital signals or other information used to represent the angular position of the rotating object within the 360-degree angular position range. As one example, processing module output signal(s) 114 may comprise one or more values indicative of the exact angular position of the rotating object within the 360-degree angular position range (e.g., one or more values between 0 and 360 degrees, or 0 to $2\pi$ radians). As another example, processing module output signal(s) 114 may comprise one or more values indicative of an angular position of the rotating object within a subset (e.g., a 180-degree sub-range) of the 360-degree angular position range (e.g., one or more values between 0 and 180 degrees, or 0 to $\pi$ radians), as well as one or more values indicative of the subset itself (e.g., one or more values indicating a first or a second 180-degree sub-range). In any case, processing module 112 may process arc position encoder output signal(s) 110 (e.g., filter, scale, normalize, level-shift, combine, etc.,) in any manner to generate processing module output signal(s) 114.

Processing module 112 may comprise any suitable arrangement of hardware, software, firmware, or any combination thereof, to perform the techniques attributed to processing module 112 in this disclosure. In general, processing module 112 may include any of one or more microprocessors, microcontrollers, digital signal processors (DSPs), application specific integrated circuits (ASICs), field programmable gate arrays (FPGAs), or any other equivalent integrated or discrete logic circuitry, as well as any combination of such components. Furthermore, processing module 112 may include various types of analog circuitry, in addition to, or in place of, the logic devices and circuitry described above.

Additionally, positive power supply 102 and negative power supply 104 may each comprise any power supply unit, module, or circuitry also included within system 100, which may, in some examples, be integrated with arc position encoder 108 and/or processing module 112 within a common enclosure, or on a common printed circuit board (PCB). Although positive power supply 102, negative power supply 104, position input 106, arc position encoder 108, arc position encoder output signal(s) 110, processing module 112, and processing module output signal(s) 114 of system 100 are described as separate units or modules for conceptual purposes, in some examples, any combination of these components of system 100 may be functionally integrated within a common enclosure, housing, or electronics, such as an electronic device (e.g., an ASIC).

Additionally, in this disclosure, any reference made to a memory, or a memory device, used to store instructions, data, or other information, includes any volatile or non-volatile media, such as random access memory (RAM), read only memory (ROM), non-volatile RAM (NVRAM), electrically erasable programmable ROM (EEPROM), flash memory, and the like. In some examples, one or more memory devices may be external to system 100 and/or processing module 112, for example, external to an enclosure or a common PCB used to enclose or house system 100 and/or processing module 112. In other examples, the one or more memory devices may be internal to system 100 and/or processing module 112, e.g., included within a common enclosure or on a common PCB.

According to the techniques of this disclosure, as one example, system 100, including arc position encoder 108 and processing module 112, may be configured to sense an angular position of a rotating object over an angular position range that includes up to 360 degrees. As previously described, the rotating object may comprise any of a variety of rotating shafts, gears, or wheels. For example, arc position encoder 108 may comprise a substantially 180-degree angular position sensing range, e.g., an angular position sensing range that is within +/−1%, 5%, or 10% of 180 degrees, as some examples. In this example, arc position encoder 108 may include a base comprising an arc length defined by a first end and a second end of the base, and one or more magnetic field sensors disposed within the base between the first and second ends. For example, the arc length of the base may correspond to the 180-degree angular position sensing range of arc position encoder 108. Furthermore, the one or more magnetic field sensors may comprise one or more MR sensors, or other magnetic sensors. Also in this example, arc position encoder 108 may further include one or more polarity transition sensors disposed within the base between the first and second ends. For example, the one or more polarity transition sensors may comprise one or more MR sensors, Hall-Effect sensors, or other magnetic sensors.

Furthermore, arc position encoder 108 may still further include a magnetic target comprising a first magnetic pole and a second magnetic pole disposed on opposite ends of the magnetic target so as to generate a uniform magnetic field. For example, the first and second magnetic poles may each comprise one or more North (N) and South (S) magnetic poles of the magnetic target. In this example, the magnetic target may be coupled to the rotating object so as to rotate about an axis of rotation located substantially in a center of a circle defined by the base.

Also in this example, at any given time, one of the first and second magnetic poles may be located within the 180-degree angular position sensing range of arc position encoder 108, and another one of the first and second magnetic poles may be located outside of the 180-degree angular position sensing range. Stated another way, one of the first and second magnetic poles may be located between 0 and 180 degrees of the 360-degree angular position range, while the other one of the first and second magnetic poles may be located between 180 and 360 degrees of the 360-degree angular position range, at any given time.

In this manner, angular position sensing system 100 of FIG. 1 represents an example of an angular position sensing system for sensing an angular position of a rotating object over an angular position range that includes up to 360 degrees, the system comprising an arc position encoder comprising a substantially 180-degree angular position sensing range, wherein the arc position encoder includes a base comprising an arc length defined by a first end and a second end of the base, one or more magnetic field sensors disposed within the base between the first and second ends, one or more polarity transition sensors disposed within the base between the first and second ends, and a magnetic target comprising a first magnetic pole and a second magnetic pole disposed on opposite ends of the magnetic target so as to generate a uniform magnetic field, wherein the magnetic target is coupled to the rotating object so as to rotate about an axis of rotation located substantially in a center of a circle defined by the base, and wherein, at any given time, one of the first and second magnetic poles is located within the 180-degree angular position sensing range of the arc position encoder, and another one of the first and second magnetic poles is located outside of the 180-degree angular position sensing range.

Figure 2:
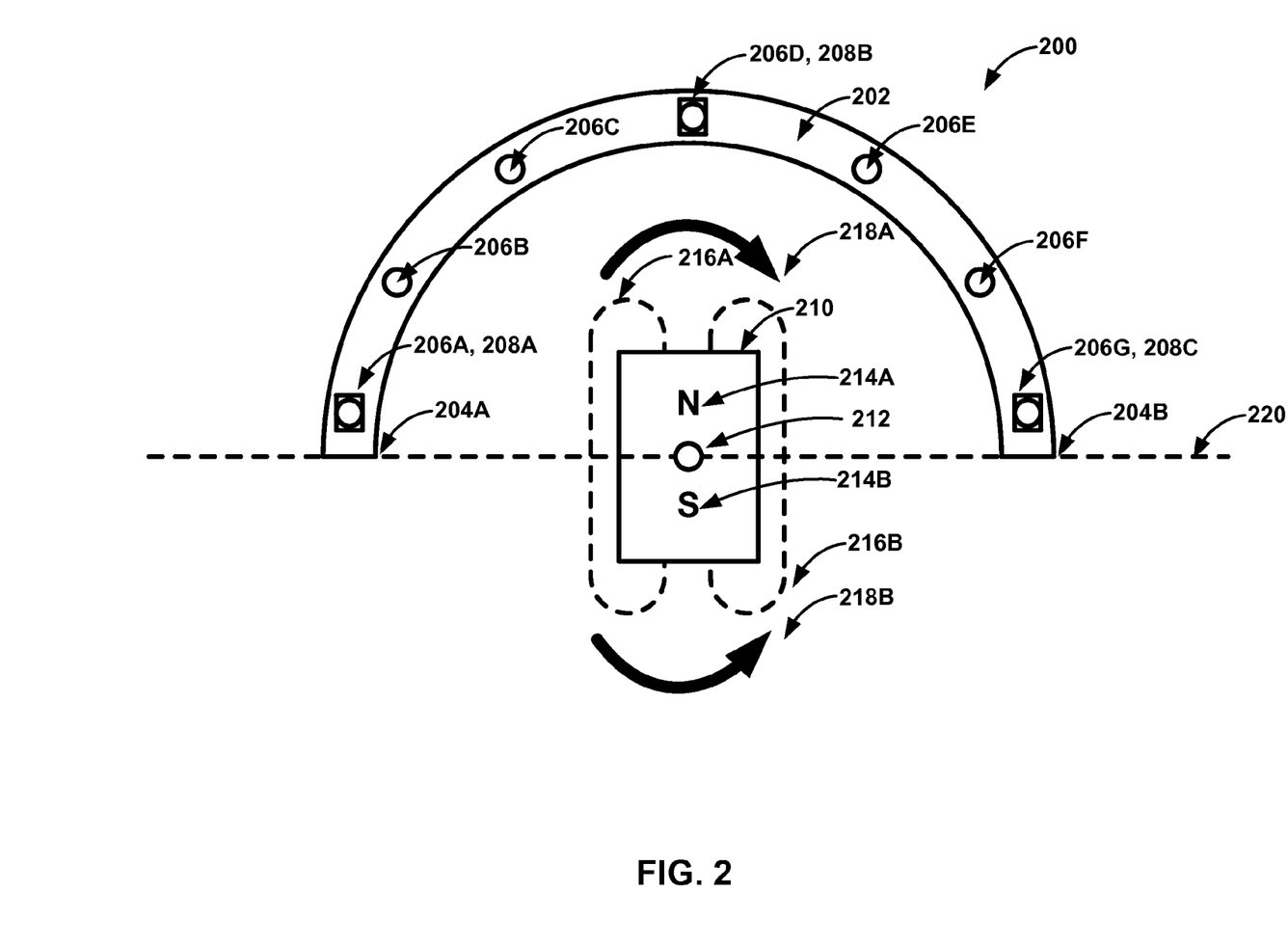
FIG. 2 is a conceptual diagram that illustrates a front view of one example of an arc position encoder which may be used in conjunction with the example angular position sensing system of FIG. 1, consistent with the techniques of this disclosure.

FIG. 2 is a conceptual diagram that illustrates a front view of one example of an arc position encoder 200 which may be used in conjunction with the example angular position sensing system 100 of FIG. 1, consistent with the techniques of this disclosure. In other words, arc position encoder 200 represents one example of arc position encoder 108 depicted in FIG. 1.

As shown in FIG. 2, arc position encoder 200 includes a base 202 comprising an arc length defined by a first end 204A and a second end 204B of base 202, as defined by horizontal axis 220, one or more magnetic field sensors 206A-206G disposed within base 202 between first and second ends 204A, 204B, one or more polarity transition sensors 208A, 208B, and 208C disposed within base 202, and a magnetic target 210 comprising a first magnetic pole 214A and a second magnetic pole 214B disposed on opposite ends of magnetic target 210 so as to generate a uniform magnetic field 216A and 216B. Magnetic target 210 may also comprise a beam coupling 212, as also shown in FIG. 2.

In the example of FIG. 2, base 202 may comprise part of an enclosure or housing of arc position encoder 200. Furthermore, arc position encoder 200 may be configured to be mounted, via base 202, within another structure, such as a system (e.g., system 100 of FIG. 1) enclosure or housing, or a system chassis. In some examples, base 202 may further include one or more mounting holes or couplings (not shown), which may be used to mount base 202 within the structure or chassis.

As can be seen in FIG. 2, a total physical angular range of arc position encoder 200, as defined by base 202, comprises substantially 180-degrees. In other examples, arc position encoder 200 may comprise a different (e.g., a smaller, or a larger) total physical angular range, i.e., base 202 may comprise a longer or a shorter arc length. Additionally, in some examples, more or fewer magnetic field sensors and polarity transition sensors may be disposed within base 202. Furthermore, in other examples, the relative placement of magnetic field sensors 206A-206G and polarity transition sensors 208A, 208B, 208C, as well as any other magnetic field sensors and polarity transition sensors, within base 202, may be different from the placement depicted in FIG. 2.

For example, magnetic field sensors 206A-206G and polarity transition sensors 208A, 208B, 208C are depicted in FIG. 2 as substantially uniformly spaced within base 202 between first and second ends 204A, 204B. As one example, magnetic field sensors 206A-206G and polarity transition sensors 208A, 208B, 208C may be spaced within base 202 in a non-uniform manner, or using another spacing or distribution scheme. As one example, polarity transition sensor 208B may be disposed within base 202 at a point along the arc length of base 202 that is substantially offset, or away from a middle point of the arc length relative to first and second ends 204A, 204B. As another example, only a subset of polarity transition sensors 208A, 208B, 208C may be disposed within base 202, e.g., one or more of polarity transition sensors 208A, 208C may be disposed within base 202 substantially at one or more of first and second ends 204A, 204B.

In the example of FIG. 2, the total physical angular range of arc position encoder 200 corresponds to a substantially 180-degree angular position sensing range of arc position encoder 200. In other words, base 202 of arc position encoder 200 spans substantially 180-degrees so as to define the 180-degree angular position sensing range of arc position encoder 200. In the example of FIG. 2, the 180-degree angular position sensing range is further defined by magnetic field sensors 206A-206G disposed within base 202, and, more specifically, their relative placement within base 202. For example, the substantially uniform distribution, or spacing, of magnetic field sensors 206A-206G within base 202 between first and second ends 204A, 204B, as well as the presence of magnetic field sensors 206A, 206G substantially at first and second ends 204A, 204B, respectively, as depicted in FIG. 2, defines the 180-degree angular position sensing range of arc position encoder 200.

Moreover, each of magnetic field sensors 206A-206G is configured to sense relative proximity of one of first and second magnetic poles 214A, 214B located within the 180-degree angular position sensing range of arc position encoder 200 to the respective magnetic field sensor. As such, an angular position sensing range of a particular one of magnetic field sensors 206A-206G may be a sub-set (e.g., 30-degrees, or 5-degrees) of the 180-degree sensing range of arc position encoder 200, and may be defined by the number and relative placement (e.g., a uniform spacing) of magnetic field sensors 206A-206G within base 202.

As previously explained, in other examples, arc position encoder 200 may comprise a different total physical angular range as defined by base 202, as well as a different number and/or relative placement of magnetic field sensors 206A-206G within base 202. For example, base 202 of arc position encoder 200 may span an arc length that is slightly longer than 180 degrees, while magnetic field sensors 206A-206G, or any other magnetic field sensors, may be disposed within a 180-degree subset of the arc length of base 202 so as to define the 180-degree angular position sensing range of arc position encoder 200.

Additionally, in the example of FIG. 2, magnetic target 210 may be coupled to a rotating object (also not shown) using beam coupling 212 disposed within magnetic target 210, as shown in FIG. 2. Beam coupling 212 may comprise any of a wide variety of thread couplings, clamp couplings, or other types of couplings. For example, the rotating object, such as a rotating shaft, gear, or wheel, may be coupled to magnetic target 210 via beam coupling 212 so as to rotate together with magnetic target 210 about an axis of rotation located substantially in a center of a circle defined by base 202, i.e., at or near the center of the circle. In the example of FIG. 2, the location of the axis of rotation may coincide with the location of beam coupling 212, such that the axis of rotation passes through beam coupling 212 and extends in an inward/outward direction (i.e., in and out of the page) relative to the front view of arc position encoder 200. For example, the rotating object and magnetic target 210 may rotate about the axis of rotation in one of a clockwise direction of rotation 218A and a counter-clockwise direction of rotation 218B relative to base 202, as also shown in FIG. 2.

As also shown in FIG. 2, as magnetic target 210 rotates in one of clockwise direction of rotation 218A and counter-clockwise direction of rotation 218B relative to base 202, magnetic field sensors 206A-206G may be configured to sense magnetic field 216A, 216B generated by magnetic target 210. For example, magnetic field sensors 206A-206G may be configured to sense relative proximity of one of first and second magnetic poles 214A, 214B located within the 180-degree angular position sensing range of arc position encoder 200 to each of magnetic field sensors 206A-206G, as explained in greater detail below. Additionally, polarity transition sensors 208A, 208B, 208C may be configured to sense transitions of each of first and second magnetic poles 214A, 214B into and out of the 180-degree sensing range, as also explained in greater detail below. In other examples, magnetic field sensors 206A-206E and polarity transition sensors 208A, 208B each may comprise more or fewer sensors, as already explained above.

According to the techniques of this disclosure, in one example, arc position encoder 200 may be included within an angular position sensing system (e.g., system 100 of FIG. 1) for sensing an angular position of a rotating object (not shown) over an angular position range that includes up to 360 degrees, i.e., anywhere within an angular position range that includes up to 360 degrees. In this example, arc position encoder 200 may comprise a substantially 180-degree angular position sensing range. For example, arc position encoder 200 may include base 202 comprising an arc length defined by first end 204A and second end 204B of base 202, one or more magnetic field sensors 206A-206G disposed within base 202 between first and second ends 204A, 204B, one or more polarity transition sensors 208A, 208B, 208C disposed within base 202 between first and second ends 204A, 204B, and magnetic target 210 comprising first magnetic pole 214A and second magnetic pole 214B disposed on opposite ends of magnetic target 210 so as to generate uniform magnetic field 216A, 216B. In this example, magnetic target 210 may be coupled to the rotating object so as to rotate about an axis of rotation located substantially in a center of a circle defined by base 202. Also in this example, at any given time, one of first and second magnetic poles 214A, 214B may be located within the 180-degree angular position sensing range of arc position encoder 200, and another one of first and second magnetic poles 214A, 214B may be located outside of the 180-degree angular position sensing range.

As another example, magnetic field sensors 206A-206G may be configured to sense relative proximity of the one of first and second magnetic poles 214A, 214B located within the 180-degree angular position sensing range of arc position encoder 200 to each magnetic field sensor of magnetic field sensors 206A-206G. For example, each of magnetic field sensors 206A-206G may be configured to sense the one of first and second magnetic poles 214A, 214B located within the 180-degree angular position sensing range as the one of first and second magnetic poles 214A, 214B passes the respective one of magnetic field sensors 206A-206G, and generate an output signal indicative of a position of the one of first and second magnetic poles 214A, 214B relative to the respective one of magnetic field sensors 206A-206G. In this example, the position indicated by the output signal generated by each of magnetic field sensors 206A-206G may comprise an angular position of the one of first and second magnetic poles 214A, 214B over a sub-range, e.g., a 30-degree sub-range, or an 5-degree sub-range, of the 180-degree sensing range of arc position encoder 200, that corresponds to the respective one of magnetic field sensors 206A-206G, and which may be referred to as an angular position sensing range of the respective one of magnetic field sensors 206A-206G.

As explained in greater detail below, a processing module (e.g., processing module 112 of FIG. 1) may be configured to combine the output signals generated by each of magnetic field sensors 206A-206G to generate one or more common output signals (e.g., processing module output signal(s) 114 of FIG. 1). For example, the one or more common output signals may indicate an angular position of each of first and second magnetic poles 214A, 214B over the 180-degree sensing range of arc position encoder 200, when the respective one of first and second magnetic poles 214A, 214B is present within the 180-degree sensing range.

In this example, to generate the one or more common output signals, the processing module may be configured to combine (e.g., level-shift) the angular position of each of first and second magnetic poles 214A, 214B over the 180-degree sensing range to determine the angular position of the rotating object over the angular position range that includes up to 360 degrees. In addition, the processing module may be further configured to process one or more of the angular position of each of first and second magnetic poles 214A, 214B over the 180-degree sensing range, such as by performing any of a variety of filtering, level-shifting or translation, or other types of signal processing or conditioning. Finally, to generate the one or more common output signals, the processing module may be still further configured to linearize one or more of the angular position of each of first and second magnetic poles 214A, 214B over the 180-degree sensing range and the angular position of the rotating object over the angular position range that includes up to 360 degrees, e.g., using the techniques described in commonly owned U.S. Pat. No. 7,030,604, or any other techniques applicable to linearization of output signals from a plurality of magnetic sensors (e.g., a magnetic sensor array). In other words, the one or more common output signals may comprise a linearized signal indicative of the angular position of the rotating object over the angular position range that includes up to 360 degrees. Finally, the processing module may be configured to output the one or more common output signals, and/or store the one or more common output signals in the one or more memories, or memory devices, described above with reference to system 100 of FIG. 1.

Additionally, as described above, the magnetic field sensors of magnetic field sensors 206A-206G may be substantially uniformly spaced within base 202 between first and second ends 204A, 204B. Alternatively, the magnetic field sensors of magnetic field sensors 206A-206G may be non-uniformly, or otherwise asymmetrically, spaced within base 202 between first and second ends 204A, 204B.

As still another example, polarity transition sensors 208A, 208B, 208C may be configured to sense a transition of one of first and second magnetic poles 214A, 214B into the 180-degree angular position sensing range of arc position encoder 200, and another one of first and second magnetic poles 214A, 214B out of the 180-degree angular position sensing range.

For example, to sense the transition of the one of first and second magnetic poles 214A, 214B into the 180-degree angular position sensing range of arc position encoder 200, and the other one of first and second magnetic poles 214A, 214B out of the 180-degree angular position sensing range, each polarity transition sensor of polarity transition sensors 208A, 208B, 208C may be configured to sense a presence of one of first and second magnetic poles 214A, 214B within substantially close proximity to the respective one of polarity transition sensors 208A, 208B, 208C, as the one of first and second magnetic poles 214A, 214B passes the respective one of polarity transition sensors 208A, 208B, 208C.

In some examples, polarity transition sensors 208A, 208B, 208C may comprise latching sensors configured to latch the transition of the one of first and second magnetic poles 214A, 214B into the 180-degree angular position sensing range of arc position encoder 200, and the other one of first and second magnetic poles 214A, 214B out of the 180-degree angular position sensing range, sensed by polarity transition sensors 208A, 208B, 208C. Alternatively, a processing module (not shown) (e.g., processing module 112 of FIG. 1), as described in greater detail below, may provide this latching functionality for each of polarity transition sensors 208A, 208B, 208C. For example, the processing module may poll, or otherwise monitor each of polarity transition sensors 208A, 208B, 208C to detect the transition of the one of first and second magnetic poles 214A, 214B into the 180-degree angular position sensing range of arc position encoder 200, and the other one of first and second magnetic poles 214A, 214B out of the 180-degree angular position sensing range, as the transition is sensed by the respective one of polarity transition sensors 208A, 208B, 208C. In this manner, polarity transition sensors 208A, 208B, 208C may comprise non-latching (e.g., lower cost) sensors, while still allowing for latching functionality for each of polarity transition sensors 208A, 208B, 208C.

Additionally, as described above, polarity transition sensors 208A, 208B, 208C may be substantially uniformly spaced within base 202 between first and second ends 204A, 204B. Alternatively, polarity transition sensors 208A, 208B, 208C may be non-uniformly, or otherwise asymmetrically, spaced within base 202 between first and second ends 204A, 204B.

In some examples, polarity transition sensors 208A, 208B, 208C may comprise one or more of polarity transition sensors 208A, 208B, 208C disposed substantially at one or more of first and second ends 204A, 204B of base 202. Additionally, in other examples, the one or more of polarity transition sensors 208A, 208B, 208C disposed substantially at the one or more of first and second ends 204A, 204B of base 202 may comprise a first one or more of polarity transition sensors 208A, 208B, 208C, wherein polarity transition sensors 208A, 208B, 208C may further comprise a second one or more of polarity transition sensors 208A, 208B, 208C disposed substantially away from first and second ends 204A, 204B along the arc length of base 202.

As still other examples, each magnetic field sensor of magnetic field sensors 206A-206G may comprise a magnetoresistive (MR) sensor. Alternatively, each magnetic field sensor of magnetic field sensors 206A-206G may comprise a Hall-Effect sensor, or another sensor. In a similar manner, each polarity transition sensor of polarity transition sensors 208A, 208B, 208C may comprise an MR sensor. Alternatively, each polarity transition sensor of polarity transition sensors 208A, 208B, 208C may comprise a Hall-Effect sensor, or another sensor.

In the examples described above, MR or Hall-Effect sensors may be used for one or both of magnetic field sensors 206A-206G and polarity transition sensors 208A, 208B, 208C. For example, while both MR and Hall-Effect sensors may be used to sense a presence of an external magnetic field (e.g., uniform magnetic field 216A, 216B generated by first and second magnetic poles 214A, 214B of magnetic target 210, as described above and with reference to FIGS. 2 and 3), these sensors differ greatly in their manner of operation.

As one example, an MR sensor may be generally configured to sense a magnitude of an external magnetic field applied to the MR sensor (e.g., until a point of saturation of the MR sensor), as well as an angle of the external magnetic field relative to the MR sensor. For example, the MR sensor may comprise one or more magnetoresistive elements a resistance of each of which changes in response to the angle (and, until the point of saturation, the magnitude) of the external magnetic field relative to the respective magnetoresistive element. For example, the change in resistance of each magnetoresistive element may be proportional to a difference between a direction of a bias current flowing through the element, and an angle of magnetization (which may be referred to as a magnetization vector) of the element by the external magnetic field. In this example, the angle of magnetization of the element by the external magnetic field is a function of the angle at which the external magnetic field is applied relative to the element. In other words, an MR sensor may respond in a similar manner to multiple magnetic fields that are applied to the MR sensor at a same angle, but have different, e.g., opposite, polarities.

In contrast, Hall-Effect sensors may generally be configured to sense a magnitude and a polarity of an external magnetic field applied transversely (i.e., at a particular angle) relative to a direction of a bias current flowing through a sensing element of the Hall-Effect sensor. The Hall-Effect sensor may sense the magnitude and polarity of the external magnetic field by generating a voltage across a dimension of the sensing element which is transverse to each of the direction of the bias current and the direction of the external magnetic field. The magnitude of this voltage (sometimes referred to as a Hall voltage) is proportional to the magnitude of the external magnetic field, and the polarity of the voltage is indicative of the polarity of the external magnetic field. Accordingly, because Hall-Effect sensors may generate an output in response to an external magnetic field that is dependent on a polarity of the external magnetic field, in one embodiment, using one or more MR sensors as magnetic field sensors 206A-206G may be preferred. Alternatively, in other embodiments, magnetic field sensors 206A-206G may comprise other sensors, as described above.

In still other examples, the angular position sensing system may further comprise a processing module (not shown) (e.g., processing module 112 of FIG. 1) configured to determine one or more polarity transition output signals of polarity transition sensors 208A, 208B, 208C, determine one or more proximity output signals of magnetic field sensors 206A-206G, and determine the angular position of the rotating object within the angular position range that includes up to 360 degrees, based at least in part on the one or more polarity transition output signals and the one or more proximity output signals.

In some examples, the angular position range may comprise a 360-degree angular position range (or a substantially 360-degree angular position range). In these examples, to determine the angular position of the rotating object within the 360-degree angular position range based at least in part on the one or more polarity transition output signals and the one or more proximity output signals, the processing module may be configured to determine whether the angular position of the rotating object within the 360-degree angular position range corresponds to a first or a second 180-degree angular position sub-range of the 360-degree angular position range, based at least in part on the one or more polarity transition output signals, wherein the first and second 180-degree angular position sub-ranges are non-overlapping consecutive angular position sub-ranges within the 360-degree angular position range. In these examples, the processing module may be further configured to determine the angular position of the rotating object within the respective one of the first and second 180-degree angular position sub-ranges to which the angular position of the rotating object within the 360-degree angular position range corresponds, based at least in part on the one or more proximity output signals.

In other examples, polarity transition sensors 208A, 208B, 208C may comprise a first one or more of polarity transition sensors 208A, 208B, 208C disposed substantially at one or more of first and second ends 204A, 204B of base 202, and a second one or more of polarity transition sensors 208A, 208B, 208C disposed substantially away from first and second ends 204A, 204B along the arc length of base 202. In these examples, to determine whether the angular position of the rotating object within the 360-degree angular position range corresponds to the first or the second 180-degree angular position sub-range of the 360-degree angular position range based at least in part on the one or more polarity transition output signals, the processing module may be configured to perform the determination based at least in part on the one or more polarity transition output signals of the first one or more of polarity transition sensors 208A, 208B, 208C, and verify the determination based at least in part on the one or more polarity transition output signals of the second one or more of polarity transition sensors 208A, 208B, 208C.

In still other examples, to determine the angular position of the rotating object within the 360-degree angular position range based at least in part on the one or more polarity transition output signals and the one or more proximity output signals, the processing module may be configured to determine whether the angular position of the rotating object within the 360-degree angular position range corresponds to a particular subset (e.g., a "quadrant") of the first or the second 180-degree angular position sub-range described above, based at least in part on the one or more polarity transition output signals. In these examples, the processing module may be further configured to determine whether the angular position of the rotating object corresponds to the first or the second 180-degree angular position sub-range based at least in part on the determined subset. Finally, having determined the one of the first and second 180-degree angular position sub-ranges to which the angular position of the rotating object corresponds, the processing module may be further configured to determine the angular position of the rotating object within the respective one of the first and second 180-degree angular position sub-ranges, based at least in part on the one or more proximity output signals. In these examples, each (i.e., all three) of polarity transition sensors 208A, 208B, 208C and their respective polarity transition output signals may be used, wherein each of polarity transition sensors 208A, 208B, 208C comprises at least one polarity transition sensor (e.g., a Hall-Effect sensor). In other examples, additional polarity transition sensors may be used.

In still other examples, the processing module may be further configured to determine one or more of an angular speed of the rotating object and a direction of angular rotation of the rotating object relative to arc position encoder 200, based at least in part on the determined angular position of the rotating object within the angular position range that includes up to 360 degrees. The particular techniques which may, in some examples, be used by the processing module to make these determinations will be described in greater detail below with reference to FIG. 5.

Finally, in some examples, the processing module may be further configured to determine the direction of angular rotation of the rotating object relative to arc position encoder 200 based at least in part on the one or more polarity transition output signals. For example, rather than being configured to determine the direction of angular rotation of the rotating object relative to arc position encoder 200 based at least in part on the determined angular position of the rotating object within the angular position range that includes up to 360 degrees, as described above, the processing module may be configured to determine the direction of angular rotation directly from the one or more polarity transition output signals. In some examples, various properties of the one or more polarity transition output signals, e.g., a phase difference, times of occurrence, or timing, generally, of two or more of such signals, may be indicative of the direction of angular rotation of the rotating object relative to arc position encoder 200.

For example, the processing module may be configured to determine, based at least in part on the one or more polarity transition output signals, that a transition of one of first and second magnetic poles 214A, 214B into the 180-degree angular position sensing range of arc position encoder 200, and another one of first and second magnetic poles 214A, 214B out of the 180-degree angular position sensing range, has occurred. As one example, the processing module may be configured to determine the direction of angular rotation of the rotating object based on, e.g., which of first and second magnetic poles 214A, 214B has transitioned into and out of the 180-degree angular position sensing range. As another example, the processing module may be configured to determine the direction of angular rotation of the rotating object based on one or more previously detected transitions (e.g., indications of which may be stored in one or more memories, or memory devices, within a corresponding angular position sensing system, e.g., system 100) of first and second magnetic poles 214A, 214B into and out of the 180-degree angular position sensing range, and the currently detected transition.

In this manner, arc position encoder 200 of FIG. 2 represents an example of an arc position encoder included within an angular position sensing system for sensing an angular position of a rotating object over an angular position range that includes up to 360 degrees, wherein the arc position encoder comprises a substantially 180-degree angular position sensing range, and wherein the arc position encoder includes a base comprising an arc length defined by a first end and a second end of the base, one or more magnetic field sensors disposed within the base between the first and second ends, one or more polarity transition sensors disposed within the base between the first and second ends, and a magnetic target comprising a first magnetic pole and a second magnetic pole disposed on opposite ends of the magnetic target so as to generate a uniform magnetic field, wherein the magnetic target is coupled to the rotating object so as to rotate about an axis of rotation located substantially in a center of a circle defined by the base, and wherein, at any given time, one of the first and second magnetic poles is located within the 180-degree angular position sensing range of the arc position encoder, and another one of the first and second magnetic poles is located outside of the 180-degree angular position sensing range.

Figure 3:
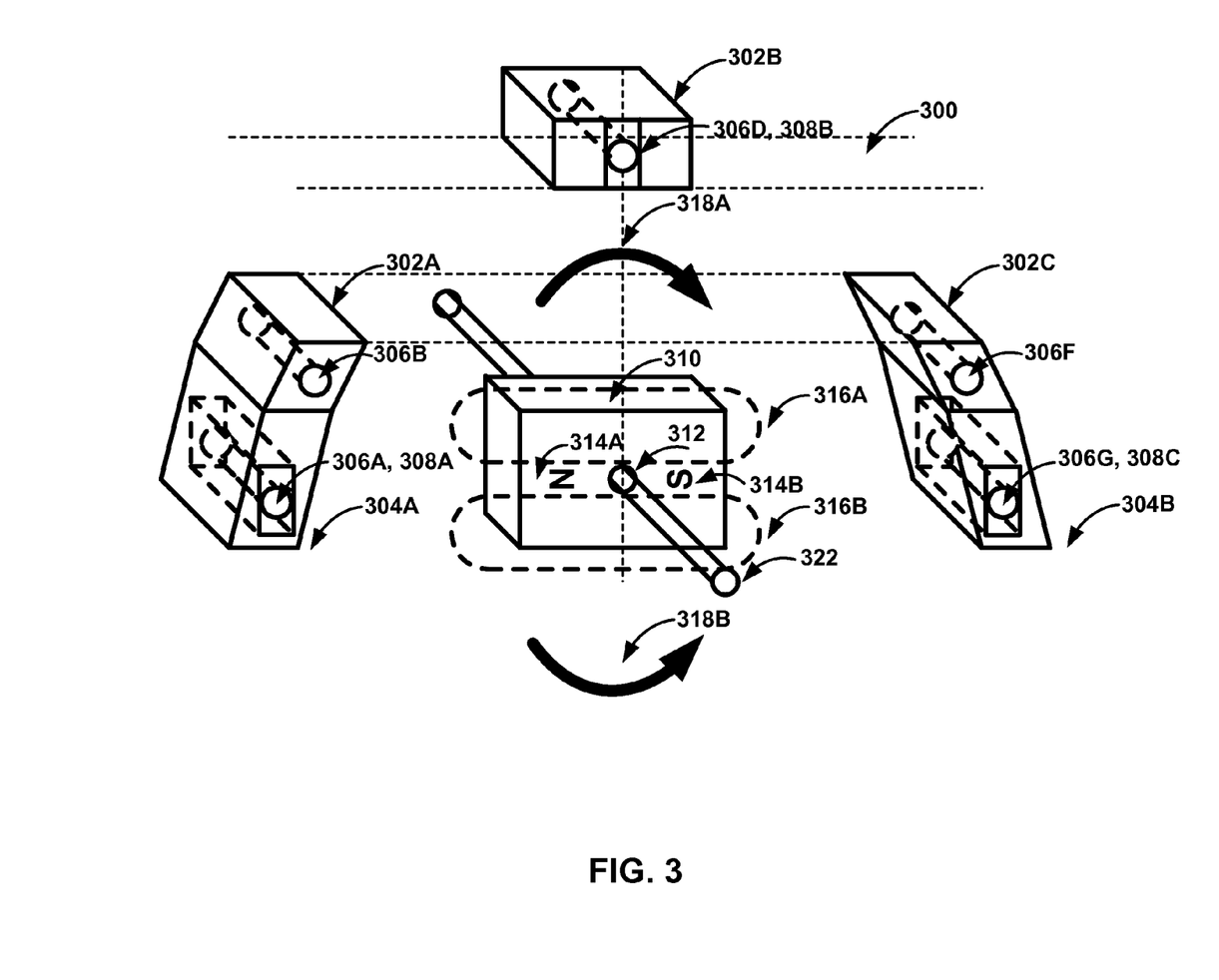
FIG. 3 is a conceptual diagram that illustrates a perspective view of the example arc position encoder of FIG. 2, consistent with the techniques of this disclosure.

FIG. 3 is a conceptual diagram that illustrates a perspective view of the example arc position encoder 200 of FIG. 2, consistent with the techniques of this disclosure. As shown in FIG. 3, arc position encoder 300 includes a base 302A, 302B, and 302C comprising an arc length defined by a first end 304A and a second end 304B of base 302A, 302B, 302C, one or more magnetic field sensors 306A, 306D, and 306G disposed within base 302A, 302B, 302C between first and second ends 304A, 304B, one or more polarity transition sensors 308A, 308B, and 308C disposed within base 302A, 302B, 302C, respectively, and a magnetic target 310 comprising a first magnetic pole 314A and a second magnetic pole 314B disposed on opposite ends of magnetic target 310 so as to generate a uniform magnetic field 316A and 316B.

In the example of FIG. 3, base 302A, 302B, 302C is depicted using three sections (i.e., 302A, 302B, 302C) for purposes of illustrating arc position encoder 300 in greater detail. It should be understood that base 302A, 302B, 302C comprises a single base, e.g., base 202 of FIG. 2, and that, although not shown in FIG. 3, the sections of base 302A, 302B, 302C are joined to form a single base (e.g., base 302) above the break-out dashed lines located above base 302A, 302C, and below the break-out dashed lines located below base 302B. Additionally, the perspective view of arc position encoder 300 depicts only three magnetic field sensors, i.e., magnetic field sensors 306A, 306D, 306G. It should also be understood that arc position encoder 300 may comprise one or more (e.g., 3, 4, 5, etc.) magnetic field sensors, e.g., 206A-

206G, as described with reference to FIG. 2, disposed within base 302A, 302B, 302C, between first and second ends 304A, 304B. Similarly, each of polarity transition sensors 308A, 308B, 308C may comprise one or more polarity transition sensors. Additionally, although not shown in FIG. 3, more or fewer polarity transition sensors may be disposed within base 302A, 302B, 302C.

Furthermore, magnetic field sensors 306A, 306D, 306G, depicted as each having a cylindrical geometry, and polarity transition sensors 308A, 308B, 308C, depicted as each having a rectangular solid geometry (or vice versa), are depicted as different sensors for purposes of illustration only. As explained above with reference to FIG. 2, each of magnetic field sensors 306A, 306D, 306G and polarity transition sensors 308A, 308B, 308C may comprise a same type of sensor, e.g., an MR sensor, or a Hall-Effect Sensor, or another type of sensor in some examples. Additionally, magnetic field sensors 306A, 306D, 306G and polarity transition sensors 308A, 308B, 308C may not be co-located as depicted in FIG. 3. In other words, in some examples, one or more of magnetic field sensors 306A, 306D, 306G and one or more of polarity transition sensors 308A, 308B, 308C may be shifted relative to one another along the arc length of base 302A, 302B, 302C.

Also, in the example of FIG. 3, magnetic target 310 is coupled to a rotating shaft 322 via beam coupling 312 disposed within magnetic target 310. In some examples, rotating shaft 322 may be coupled to a rotating object (not shown). In other examples, rotating shaft 322 may itself be a rotating object, or part of a rotating object. Beam coupling 312 may comprise any of a wide variety of thread couplings, clamp couplings, or other types of couplings. In any case, the rotating object may be coupled to magnetic target 310 via beam coupling 312 so as to rotate together with magnetic target 310 about an axis of rotation located substantially in a center of a circle defined by base 302A, 302B, 302C. In the example of FIG. 3, the location of the axis of rotation may coincide with the location of beam coupling 312, such that the axis of rotation passes through beam coupling 312 and extends in an inward/outward direction relative to a front view of arc position encoder 300, as explained above with reference to arc position encoder 200 of FIG. 2. For example, the rotating object and magnetic target 310 may rotate about the axis of rotation in one of a clockwise direction of rotation 318A and a counterclockwise direction of rotation 318B relative to base 302A, 302B, 302C as also shown in FIG. 3. In the example of FIG. 3, magnetic target 310 is rotated 90-degrees in counterclockwise direction of rotation 318B relative to magnetic target 210 as depicted in FIG. 2.

In this manner, arc position encoder 300 of FIG. 3 represents an example of an arc position encoder included within an angular position sensing system for sensing an angular position of a rotating object over an angular position range that includes up to 360 degrees, wherein the arc position encoder comprises a substantially 180-degree angular position sensing range, and wherein the arc position encoder includes a base comprising an arc length defined by a first end and a second end of the base, one or more magnetic field sensors disposed within the base between the first and second ends, one or more polarity transition sensors disposed within the base between the first and second ends, and a magnetic target comprising a first magnetic pole and a second magnetic pole disposed on opposite ends of the magnetic target so as to generate a uniform magnetic field, wherein the magnetic target is coupled to the rotating object so as to rotate about an axis of rotation located substantially in a center of a circle defined by the base, and wherein, at any given time, one of the first and second magnetic poles is located within the 180-degree angular position sensing range of the arc position encoder, and another one of the first and second magnetic poles is located outside of the 180-degree angular position sensing range.

Figure 4A:
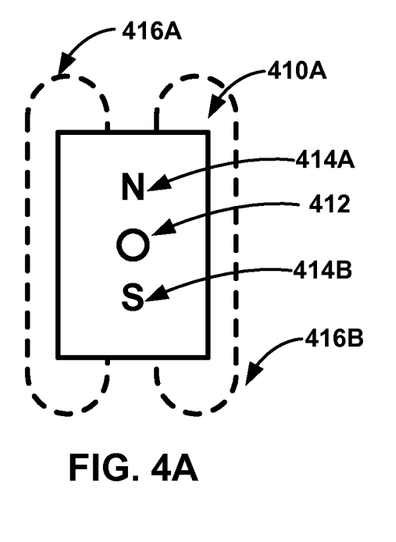
FIGS. 4A and 4B are conceptual diagrams that each illustrate a front view of an example magnetic target that may be used as part of the example arc position encoder of each of FIGS. 2 and 3, consistent with the techniques of this disclosure.
Figure 4B:
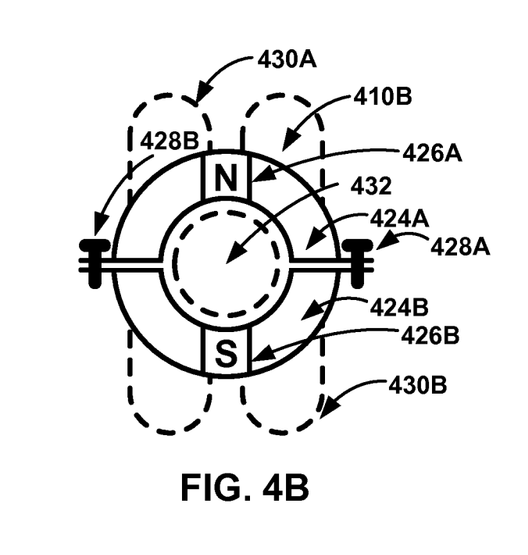

FIGS. 4A and 4B are conceptual diagrams that each illustrate a front view of an example magnetic target that may be used as part of each of the example arc position encoders 200 and 300 of FIGS. 2 and 3, respectively, consistent with the techniques of this disclosure. In other words, the magnetic target 410A of FIG. 4A and the magnetic target 410B of FIG. 4B each represent one example of each of magnetic targets 210 and 310 of FIGS. 2 and 3, respectively.

As shown in FIG. 4A, as one example, magnetic target 410A may comprise a first magnetic pole 414A and a second magnetic pole 414B disposed on opposite ends of magnetic target 410A so as to generate a uniform magnetic field 416A and 416B. Additionally, magnetic target 410A may also comprise a beam coupling 412, as also shown in FIG. 4A, which may be used to couple magnetic target 410A to a rotating object (e.g., a rotating shaft, such as rotating shaft 322 of FIG. 3). In other words, in some examples, magnetic target 410A may comprise a rectangular geometry and a coupling scheme for coupling magnetic target 410A to a rotating object as depicted in FIG. 4A, as has already been described above with reference to each of magnetic targets 210 and 310 of FIGS. 2 and 3, respectively.

As shown in FIG. 4B, as another example, rather than comprising a rectangular geometry as described above with reference to FIG. 4A, magnetic target 410B may comprise a circular magnet holder that includes two semi-circular portions 424A and 424B. Magnetic target 410B may further comprise a first magnetic pole 426A and a second magnetic pole 426B disposed on opposite ends of magnetic target 410B within the respective ones of portions 424A, 424B, so as to generate a uniform magnetic field 430A and 430B. Magnetic target 410B may also comprise as a first coupling means 428A and a second coupling means 428B. In the example of FIG. 4B, each of first and second coupling means 428A, 428B may comprise any of a wide variety of coupling means, such as, e.g., thread couplings, clamp couplings, or other types of couplings. As depicted in FIG. 4B, first and second coupling means 428A, 428B each comprise a threaded bolt- or screw-based coupling.

For example, using the above-described configuration as depicted in FIG. 4B, magnetic target 410B may be coupled to a rotating object (e.g., a rotating shaft, such as rotating shaft 322 of FIG. 3), an example of which is depicted as cross-section 432 in FIG. 4B. In other words, portions 424A, 424B of magnetic target 410B may be clamped, or otherwise attached to the rotating object, such as a cylindrical shaft, by clamping each of portions 424A, 424B around the rotating object, in some examples.

Figure 5:
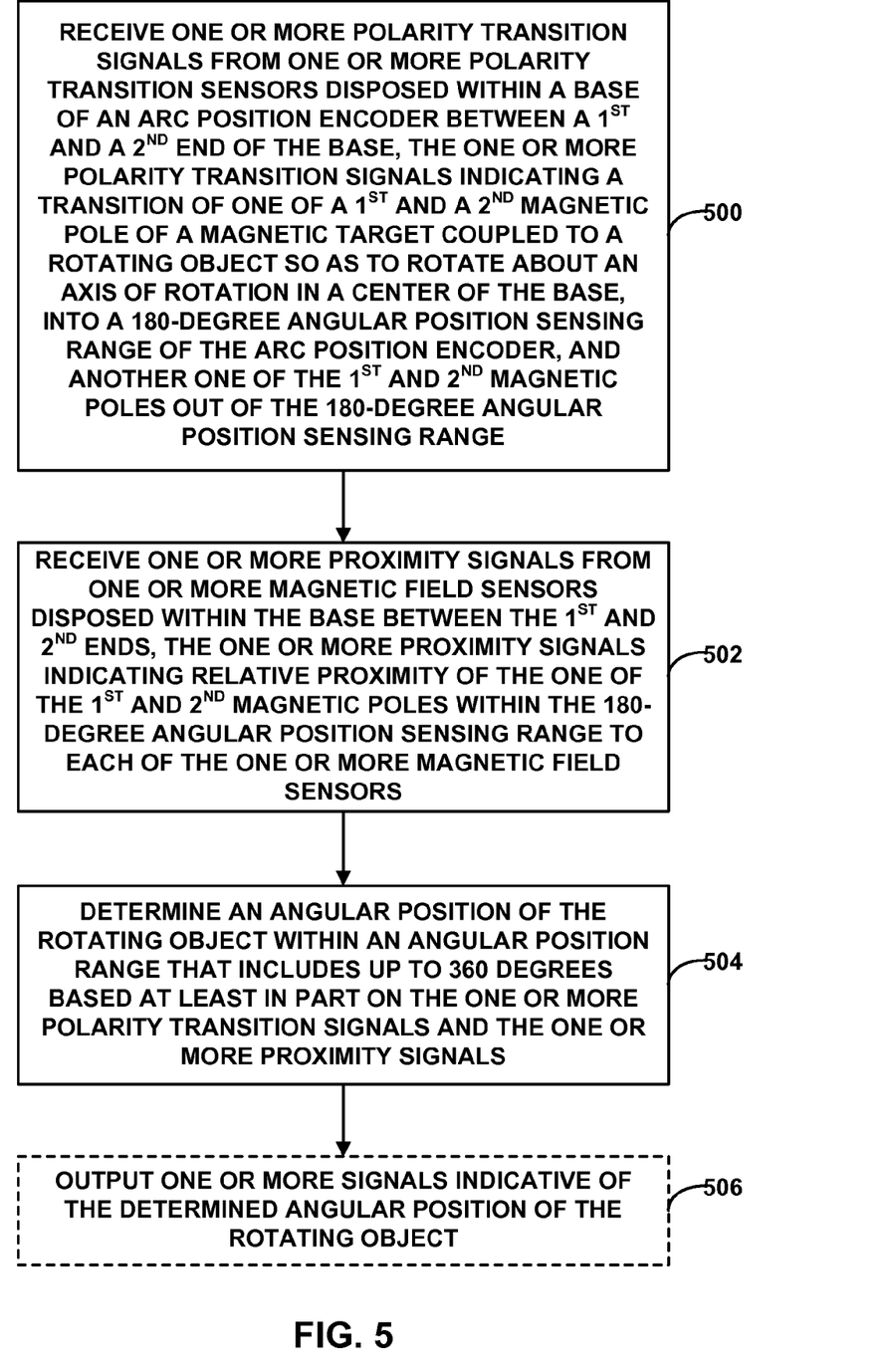
FIG. 5 is a flow diagram that illustrates one example of a method of sensing an angular position of a rotating object over an angular position range that includes up to 360 degrees using an arc position encoder comprising a substantially 180-degree angular position sensing range, consistent with the techniques of this disclosure.

FIG. 5 is a flow diagram that illustrates one example of a method of sensing an angular position of a rotating object over an angular position range that includes up to 360 degrees using an arc position encoder comprising a substantially 180-degree angular position sensing range, consistent with the techniques of this disclosure. The techniques of FIG. 5 may generally be performed by any processing unit or processor, whether implemented in hardware, software, firmware, or a combination thereof, and when implemented in software or firmware, corresponding hardware may be provided to execute instructions for the software or firmware. For purposes of example, the techniques of FIG. 5 are described with respect to angular position sensing system 100 (FIG. 1), arc position encoder 108 (FIG. 1), 200 (FIG. 2), and 300 (FIG. 3), and processing module 112 (FIG. 1), as well as various components thereof, although it should be understood that other systems or devices may be configured to perform similar techniques. Moreover, the steps illustrated in FIG. 5 may be performed in a different order or in parallel, and additional steps may be added and certain steps omitted, without departing from the techniques of this disclosure.

In one example, a processing module (e.g., 112) of an angular position sensing system (e.g., 100) that includes the processing module and an arc position encoder (e.g., 108, 200, and 300) may be configured to sense an angular position of a rotating object over an angular position range that includes up to 360 degrees using the arc position encoder. In this example, the arc position encoder may comprise a substantially 180-degree angular position sensing range.

For example, the processing module may initially receive one or more polarity transition signals from one or more polarity transition sensors disposed within a base of the arc position encoder between a first end and a second end of the base, the one or more polarity transition signals indicating a transition of one of a first magnetic pole and a second magnetic pole of a magnetic target coupled to the rotating object so as to rotate about an axis of rotation located substantially in a center of a circle defined by the base, wherein the first and second magnetic poles are disposed on opposite ends of the magnetic target so as to generate a uniform magnetic field, into the 180-degree angular position sensing range of the arc position encoder, and another one of the first and second magnetic poles out of the 180-degree angular position sensing range (500).

The processing module may further receive one or more proximity signals from one or more magnetic field sensors disposed within the base between the first and second ends, the one or more proximity signals indicating relative proximity of the one of the first and second magnetic poles within the 180-degree angular position sensing range of the arc position encoder to each of the one or more magnetic field sensors (502).

The processing module may still further determine the angular position of the rotating object within the angular position range that includes up to 360 degrees based at least in part on the one or more polarity transition signals and the one or more proximity signals (504).

In some examples, to sense the transition of the one of the first and second magnetic poles into the 180-degree angular position sensing range of the arc position encoder, and the other one of the first and second magnetic poles out of the 180-degree angular position sensing range, each polarity transition sensor of the one or more polarity transition sensors may sense a presence of one of the first and second magnetic poles within substantially close proximity to the respective one of the one or more polarity transition sensors, as the one of the first and second magnetic poles passes the respective one of the one or more polarity transition sensors. Also, in other examples, the one or more polarity transition sensors may comprise latching sensors configured to latch the transition of the one of the first and second magnetic poles into the 180-degree angular position sensing range of the arc position encoder, and the other one of the first and second magnetic poles out of the 180-degree angular position sensing range, sensed by the one or more polarity transition sensors.

Additionally, in some examples, the angular position range may comprise a 360-degree angular position range (or a substantially 360-degree angular position range). In these examples, to determine the angular position of the rotating object within the 360-degree angular position range based at least in part on the one or more polarity transition signals and the one or more proximity signals, the processing module may determine whether the angular position of the rotating object within the 360-degree angular position range corresponds to a first or a second 180-degree angular position sub-range of the 360-degree angular position range, based at least in part on the one or more polarity transition signals, wherein the first and second 180-degree angular position sub-ranges are non-overlapping consecutive angular position sub-ranges within the 360-degree angular position range. The processing module may further determine the angular position of the rotating object within the respective one of the first and second 180-degree angular position sub-ranges to which the angular position of the rotating object within the 360-degree angular position range corresponds, based at least in part on the one or more proximity signals.

As one example, the one or more polarity transition sensors may comprise a first one or more of the one or more polarity transition sensors disposed substantially at one or more of the first and second ends of the base and a second one or more of the one or more polarity transition sensors disposed substantially away from the first and second ends along the arc length of the base. In this example, to determine whether the angular position of the rotating object within the 360-degree angular position range corresponds to the first or the second 180-degree angular position sub-range of the 360-degree angular position range based at least in part on the one or more polarity transition signals, the processing module may perform the determination based at least in part on the one or more polarity transition signals of the first one or more of the one or more polarity transition sensors, and verify the determination based at least in part on the one or more polarity transition signals of the second one or more of the one or more polarity transition sensors.

As previously described, as another example, to determine the angular position of the rotating object within the 360-degree angular position range based at least in part on the one or more polarity transition output signals and the one or more proximity output signals, the processing module may be configured to determine whether the angular position of the rotating object within the 360-degree angular position range corresponds to a particular subset (e.g., a "quadrant") of the first or the second 180-degree angular position sub-range described above, based at least in part on the one or more polarity transition output signals. In these examples, the processing module may be further configured to determine whether the angular position of the rotating object corresponds to the first or the second 180-degree angular position sub-range based at least in part on the determined subset. Finally, having determined the one of the first and second 180-degree angular position sub-ranges to which the angular position of the rotating object corresponds, the processing module may be further configured to determine the angular position of the rotating object within the respective one of the first and second 180-degree angular position sub-ranges, based at least in part on the one or more proximity output signals. In these examples, three or more polarity transition sensors and their respective polarity transition output signals may be used, wherein each of the polarity transition sensors may comprise at least one polarity transition sensor (e.g., a Hall-Effect sensor). In other examples, additional polarity transition sensors may be used.

In other examples, the processing module may determine one or more of an angular speed of the rotating object and a direction of angular rotation of the rotating object relative to the arc position encoder, based at least in part on the determined angular position of the rotating object within the angular position range that includes up to 360 degrees. For example, the processing module may determine the angular speed (e.g., in radians/second (w), degrees/second, or revolutions per minute (RPM)) of the rotating object based on the determined angular position of the rotating object within the angular position range that includes up to 360 degrees at a particular first point in time, which may be referred to as a first angular position, as well as based on a second, different angular position of the rotating object within the angular position range at a subsequent second point in time. In this example, the processing module may determine the angular speed of the rotating object by dividing a difference between the first and second angular positions (e.g., second angular position-first angular position=Δ (angular position), which is proportional to the angular distance traveled by the rotating object) by a difference between the first and second times (e.g., second time-first time=Δ (time), which equals the time elapsed). For example, to determine the angular speed of the rotating object, the processing module may utilize the following expression:

$$\omega = \Delta(\text{angular position})/\Delta(\text{time}) \qquad \text{EQ. 1}$$

Where ω corresponds to the angular speed of the rotating object, Δ (angular position) corresponds to a difference between the first and second angular positions, and Δ (time) corresponds to a difference between the first and second times. In other words, the angular speed of the rotating object may be expressed as a change in angular position of the rotating object over a unit of time.

In a similar manner, the processing module may determine the direction of angular rotation (e.g., clockwise or counter-clockwise) of the rotating object relative to the arc position encoder based on the determined angular position of the rotating object within the angular position range that includes up to 360 degrees, which may once again be referred to as a first angular position, at a first point in time, by determining a second, different angular position of the rotating object within the angular position range at a subsequent second point in time. In this example, the processing module may determine the direction of angular rotation by determining a sign of a difference between the first and second angular positions (e.g., sign of Δ (angular position), where Δ (angular position)=second angular position-first angular position). For example, to determine the direction of angular rotation of the rotating object, the processing module may utilize the following expression:

$$\text{DIR} = \text{SIGN}(\Delta(\text{angular position})) \qquad \text{EQ. 2}$$

Where DIR corresponds to the direction of angular rotation of the rotating object, Δ (angular position) corresponds to the difference between the first and second angular positions, and SIGN indicates a sign operator used to determine the sign of the difference between the first and second angular positions. Accordingly, the direction of angular rotation of the rotating object may be represented using a sign (e.g., "+" or "−") that corresponds to the direction of angular rotation, which may, in turn, comprise one of e.g., a clockwise and a counterclockwise direction of rotation. In one example, DIR="+" may correspond to a clockwise direction of angular rotation of the rotating object, and DIR="−" may correspond to a counterclockwise direction of angular rotation of the rotating object. In other examples, different values of DIR may correspond to different directions of angular rotation of the rotating object.

Additionally, the processing module may determine the direction of angular rotation of the rotating object relative to the arc position encoder based at least in part on the one or more polarity transition signals. For example, rather than determining the direction of angular rotation of the rotating object relative to the arc position encoder based at least in part on the determined angular position of the rotating object within the angular position range that includes up to 360 degrees, as described above, the processing module may determine the direction of angular rotation directly from the one or more polarity transition signals. In some examples, various properties of the one or more polarity transition signals, e.g., a phase difference, times of occurrence, or timing, generally, of two or more of such signals, may be indicative of the direction of angular rotation of the rotating object relative to the arc position encoder.

For example, as described above, the processing module may determine, based at least in part on the one or more polarity transition output signals, that a transition of one of the first and second magnetic poles into the 180-degree angular position sensing range of the arc position encoder, and another one of the first and second magnetic poles out of the 180-degree angular position sensing range, has occurred. As one example, the processing module may determine the direction of angular rotation of the rotating object based on, e.g., which of the first and second magnetic poles has transitioned into and out of the 180-degree angular position sensing range. As another example, the processing module may determine the direction of angular rotation of the rotating object based on one or more previously detected transitions (e.g., indications of which may be stored in one or more memories, or memory devices, within the angular position sensing system) of the first and second magnetic poles into and out of the 180-degree angular position sensing range, and the currently detected transition.

In some examples, the processing module may still further output one or more signals indicative of the determined angular position of the rotating object (506). As one example, the processing module may output a single signal indicative of the angular position of the rotating object over the angular position sensing range that includes up to 360 degrees, e.g., a value between 0 and 360, or another value, that is representative of the angular position of the rotating object within the angular position range. Alternatively, as described above, in cases where the angular position range comprises a 360-degree angular position range, the processing module may output a first signal indicative of whether the angular position of the rotating object within the 360-degree angular position range corresponds to a first or a second 180-degree angular position sub-range of the 360-degree angular position range. As also described above, the first and second 180-degree angular position sub-ranges may be non-overlapping consecutive angular position sub-ranges within the 360-degree angular position range. Additionally, the processing module may further output a second signal indicative of the angular position of the rotating object within the respective one of the first and second 180-degree angular position sub-ranges to which the angular position of the rotating object within the 360-degree angular position range corresponds.

Furthermore, as also described above, to output the one or more "output" signals indicative of the determined angular position of the rotating object, the processing module may combine (e.g., level-shift) the angular position of each of the first and second magnetic poles over the 180-degree sensing range, as indicated by the one or more proximity signals from the one or more magnetic field sensors, to determine the angular position of the rotating object over the angular position range that includes up to 360 degrees. For example, the processing module may combine the one or more proximity signals generated by the one or more magnetic field sensors for each of the first and second magnetic poles when the respective one of the first and second magnetic poles is located within the 180-degree angular position sensing range of the arc position encoder, to generate the one or more output signals.

In addition, the processing module may further process the one or more proximity signals, prior to, or after the combining, such as by performing any of a variety of filtering, level-shifting or translation, or other types of signal processing or conditioning, to generate the one or more output signals. Finally, to generate the one or more output signals, the processing module may still further linearize one or more of the one or more proximity signals and the angular position of the rotating object over the angular position range that includes up to 360 degrees, e.g., using any techniques applicable to linearization of output signals from a plurality of magnetic sensors. In other words, the one or more output signals may comprise a linearized signal indicative of the angular position of the rotating object over the angular position range that includes up to 360 degrees.

Finally, as described above, the processing module may further output the one or more output signals, and/or store the one or more output signals in the one or more memories, or memory devices, described above with reference to system 100 of FIG. 1.

In any case, the one or more output signals, whether represented as a single signal, or a plurality of signals, may comprise one or more analog signals, one or more digital signals, or any combination thereof.

The techniques of this disclosure may enable the angular position sensing system (e.g., angular position sensing system 100) including the arc position encoder (e.g., arc position encoder 108, 200, 300) and the processing module (e.g., processing module 112), as described above, to sense the angular position of the rotating object over the angular position range that includes up to 360 degrees, i.e., anywhere within an angular position range that includes up to 360 degrees. Accordingly, in contrast to other angular position sensing techniques which may be used to sense an angular position of a rotating object over an angular position range that includes up to 360 degrees, for example, techniques using a plurality of (e.g., two) arc position encoders each comprising a 180-degree angular position sensing range, or a relatively more complex full-range angular position encoder, the techniques of this disclosure may enable sensing the angular position of the rotating object over the angular position range using a single arc position encoder comprising a substantially 180-degree angular position sensing range.

In this manner, the method of FIG. 5 represents an example of a method of sensing an angular position of a rotating object over an angular position range that includes up to 360 degrees using an arc position encoder comprising a substantially 180-degree angular position sensing range, the method comprising receiving one or more polarity transition signals from one or more polarity transition sensors disposed within a base of the arc position encoder between a first end and a second end of the base, the one or more polarity transition signals indicating a transition of one of a first magnetic pole and a second magnetic pole of a magnetic target coupled to the rotating object so as to rotate about an axis of rotation located substantially in a center of a circle defined by the base, wherein the first and second magnetic poles are disposed on opposite ends of the magnetic target so as to generate a uniform magnetic field, into the 180-degree angular position sensing range of the arc position encoder, and another one of the first and second magnetic poles out of the 180-degree angular position sensing range, receiving one or more proximity signals from one or more magnetic field sensors disposed within the base between the first and second ends, the one or more proximity signals indicating relative proximity of the one of the first and second magnetic poles within the 180-degree angular position sensing range of the arc position encoder to each of the one or more magnetic field sensors, and determining the angular position of the rotating object within the angular position range that includes up to 360 degrees based at least in part on the one or more polarity transition signals and the one or more proximity signals.

The techniques of this disclosure may be implemented in a wide variety of computer devices. Any components, units, or modules that have been described are provided to emphasize functional aspects, and do not necessarily require realization by different hardware units. The techniques described herein may also be implemented in hardware, software, firmware, or any combination thereof. Any features described as modules, units, or components may be implemented together in an integrated logic device, or separately as discrete but interoperable logic devices. In some cases, various features may be implemented as an integrated circuit device, such as an integrated circuit chip, or chipset.

If any aspects of the techniques are implemented in software, the techniques may be realized at least in part by a computer-readable storage medium comprising instructions that, when executed in a processor, performs one or more of the methods described above. The computer-readable storage medium may comprise a tangible computer-readable storage medium, and may form part of a larger product. The computer-readable storage medium may comprise random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The computer-readable storage medium may also comprise a non-volatile storage device, such as a hard-disk, magnetic tape, a compact disc (CD), digital versatile disc (DVD), Blu-ray disc, holographic data storage media, or other non-volatile storage device.

The memory, or memory devices, described herein, which may be used as part of the described techniques, may also be realized in any of a wide variety of memory, or memory devices, including but not limited to, RAM, SDRAM, NVRAM, EEPROM, FLASH memory, dynamic RAM (DRAM), magnetic RAM (MRAM), or other types of memory.

The term "processor" as used herein may refer to any of the foregoing structure or any other structure suitable for implementation of the techniques described herein. In addition, in some aspects, the functionality described herein may be provided within dedicated software modules or hardware modules configured for performing the techniques of this disclosure. Even if implemented in software, the techniques may use hardware such as a processor to execute the software, and a memory to store the software. In any such cases, the computers described herein may define a specific machine that is capable of executing the specific functions described herein. Also, the techniques could be fully implemented in one or more circuits or logic elements, which could also be considered a processor.

Various examples have been described. These and other examples are within the scope of the following claims.

What is claimed is:

1. An angular position sensing system for sensing an angular position of a rotating object over an angular position range that includes up to 360 degrees, the system comprising:
   an arc position encoder comprising a substantially 180-degree angular position sensing range, wherein the arc position encoder includes:
      a base comprising an arc length defined by a first end and a second end of the base;
      one or more magnetic field sensors disposed within the base between the first and second ends;
      one or more polarity transition sensors disposed within the base between the first and second ends; and
      a magnetic target comprising a first magnetic pole and a second magnetic pole disposed on opposite ends of the magnetic target so as to generate a uniform magnetic field, wherein the magnetic target is coupled to the rotating object so as to rotate about an axis of rotation located substantially in a center of a circle defined by the base, and wherein, at any given time, one of the first and second magnetic poles is located within the 180-degree angular position sensing range of the arc position encoder, and another one of the first and second magnetic poles is located outside of the 180-degree angular position sensing range.

2. The angular position sensing system of claim 1, wherein the one or more magnetic field sensors are configured to sense relative proximity of the one of the first and second magnetic poles located within the 180-degree angular position sensing range of the arc position encoder to each magnetic field sensor of the one or more magnetic field sensors.

3. The angular position sensing system of claim 1, wherein the one or more magnetic field sensors are substantially uniformly spaced within the base between the first and second ends.

4. The angular position sensing system of claim 1, wherein the one or more polarity transition sensors are configured to sense a transition of one of the first and second magnetic poles into the 180-degree angular position sensing range of the arc position encoder, and another one of the first and second magnetic poles out of the 180-degree angular position sensing range.

5. The angular position sensing system of claim 4, wherein to sense the transition of the one of the first and second magnetic poles into the 180-degree angular position sensing range of the arc position encoder, and the other one of the first and second magnetic poles out of the 180-degree angular position sensing range, each polarity transition sensor of the one or more polarity transition sensors is configured to sense a presence of one of the first and second magnetic poles within substantially close proximity to the respective one of the one or more polarity transition sensors, as the one of the first and second magnetic poles passes the respective one of the one or more polarity transition sensors.

6. The angular position sensing system of claim 4, wherein the one or more polarity transition sensors comprise latching sensors configured to latch the transition of the one of the first and second magnetic poles into the 180-degree angular position sensing range of the arc position encoder, and the other one of the first and second magnetic poles out of the 180-degree angular position sensing range, sensed by the one or more polarity transition sensors.

7. The angular position sensing system of claim 1, wherein the one or more polarity transition sensors are substantially uniformly spaced within the base between the first and second ends.

8. The angular position sensing system of claim 1, wherein the one or more polarity transition sensors comprise one or more of the one or more polarity transition sensors disposed substantially at one or more of the first and second ends of the base.

9. The angular position sensing system of claim 8, wherein the one or more of the one or more polarity transition sensors disposed substantially at the one or more of the first and second ends of the base comprise a first one or more of the one or more polarity transition sensors, and wherein the one or more polarity transition sensors further comprise a second one or more of the one or more polarity transition sensors disposed substantially away from the first and second ends along the arc length of the base.

10. The angular position sensing system of claim 1, wherein each magnetic field sensor of the one or more magnetic field sensors comprises a magnetoresistive (MR) sensor.

11. The angular position sensing system of claim 1, wherein each polarity transition sensor of the one or more polarity transition sensors comprises one of a Hall-Effect sensor and a magnetoresistive (MR) sensor.

12. The angular position sensing system of claim 1, further comprising a processing module configured to:
   determine one or more polarity transition output signals of the one or more polarity transition sensors;
   determine one or more proximity output signals of the one or more magnetic field sensors; and
   determine the angular position of the rotating object within the angular position range that includes up to 360 degrees, based at least in part on the one or more polarity transition output signals and the one or more proximity output signals.

13. The angular position sensing system of claim 12, wherein the angular position range comprises a 360-degree angular position range, and wherein to determine the angular position of the rotating object within the 360-degree angular position range based at least in part on the one or more polarity transition output signals and the one or more proximity output signals, the processing module is configured to:
   determine whether the angular position of the rotating object within the 360-degree angular position range corresponds to a first or a second 180-degree angular position sub-range of the 360-degree angular position range, based at least in part on the one or more polarity transition output signals, wherein the first and second 180-degree angular position sub-ranges are non-overlapping consecutive angular position sub-ranges within the 360-degree angular position range; and
   determine the angular position of the rotating object within the respective one of the first and second 180-degree angular position sub-ranges to which the angular position of the rotating object within the 360-degree angular position range corresponds, based at least in part on the one or more proximity output signals.

14. The angular position sensing system of claim 13, wherein the one or more polarity transition sensors comprise a first one or more of the one or more polarity transition sensors disposed substantially at one or more of the first and second ends of the base and a second one or more of the one or more polarity transition sensors disposed substantially away from the first and second ends along the arc length of the base, and wherein to determine whether the angular position of the rotating object within the 360-degree angular position range corresponds to the first or the second 180-degree angular position sub-range of the 360-degree angular position range based at least in part on the one or more polarity transition output signals, the processing module is configured to:

perform the determination based at least in part on the one or more polarity transition output signals of the first one or more of the one or more polarity transition sensors; and verify the determination based at least in part on the one or more polarity transition output signals of the second one or more of the one or more polarity transition sensors.

15. The angular position sensing system of claim 12, wherein the processing module is further configured to determine one or more of an angular speed of the rotating object and a direction of angular rotation of the rotating object relative to the arc position encoder, based at least in part on the determined angular position of the rotating object within the angular position range that includes up to 360 degrees.

16. The angular position sensing system of claim 12, wherein the processing module is further configured to determine a direction of angular rotation of the rotating object relative to the arc position encoder, based at least in part on the one or more polarity transition output signals.

17. A method of sensing an angular position of a rotating object over an angular position range that includes up to 360 degrees using an arc position encoder comprising a substantially 180-degree angular position sensing range, the method comprising:

receiving one or more polarity transition signals from one or more polarity transition sensors disposed within a base of the arc position encoder between a first end and a second end of the base, the one or more polarity transition signals indicating a transition of one of a first magnetic pole and a second magnetic pole of a magnetic target coupled to the rotating object so as to rotate about an axis of rotation located substantially in a center of a circle defined by the base, wherein the first and second magnetic poles are disposed on opposite ends of the magnetic target so as to generate a uniform magnetic field, into the 180-degree angular position sensing range of the arc position encoder, and another one of the first and second magnetic poles out of the 180-degree angular position sensing range;

receiving one or more proximity signals from one or more magnetic field sensors disposed within the base between the first and second ends, the one or more proximity signals indicating relative proximity of the one of the first and second magnetic poles within the 180-degree angular position sensing range of the arc position encoder to each of the one or more magnetic field sensors; and determining the angular position of the rotating object within the angular position range that includes up to 360 degrees based at least in part on the one or more polarity transition signals and the one or more proximity signals.

18. The method of claim 17, wherein the angular position range comprises a 360-degree angular position range, and wherein determining the angular position of the rotating object within the 360-degree angular position range based at least in part on the one or more polarity transition signals and the one or more proximity signals comprises:

determining whether the angular position of the rotating object within the 360-degree angular position range corresponds to a first or a second 180-degree angular position sub-range of the 360-degree angular position range, based at least in part on the one or more polarity transition signals, wherein the first and second 180-degree angular position sub-ranges are non-overlapping consecutive angular position sub-ranges within the 360-degree angular position range; and determining the angular position of the rotating object within the respective one of the first and second 180-degree angular position sub-ranges to which the angular position of the rotating object within the 360-degree angular position range corresponds, based at least in part on the one or more proximity signals.

19. The method of claim 18, wherein the one or more polarity transition sensors comprise a first one or more of the one or more polarity transition sensors disposed substantially at one or more of the first and second ends of the base and a second one or more of the one or more polarity transition sensors disposed substantially away from the first and second ends along the arc length of the base, and wherein determining whether the angular position of the rotating object within the 360-degree angular position range corresponds to the first or the second 180-degree angular position sub-range of the 360-degree angular position range based at least in part on the one or more polarity transition signals comprises:

performing the determination based at least in part on the one or more polarity transition signals of the first one or more of the one or more polarity transition sensors; and verifying the determination based at least in part on the one or more polarity transition signals of the second one or more of the one or more polarity transition sensors.

20. The method of claim 17, further comprising:

determining one or more of an angular speed of the rotating object and a direction of angular rotation of the rotating object relative to the arc position encoder, based at least in part on the determined angular position of the rotating object within the angular position range that includes up to 360 degrees.

* * * * *